(12) United States Patent
Kim

(10) Patent No.: US 6,772,948 B2
(45) Date of Patent: Aug. 10, 2004

(54) MANUAL BAR CODE SCANNER WITH IMPROVED RELIABILITY

(75) Inventor: Seung Kil Kim, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 193 days.

(21) Appl. No.: 09/750,549

(22) Filed: Dec. 28, 2000

(65) Prior Publication Data

US 2002/0121552 A1 Sep. 5, 2002

(51) Int. Cl.[7] ............................................. G02B 26/10
(52) U.S. Cl. ..................... 235/462.25; 235/462.41; 235/462.42; 235/472.01; 235/472.02; 235/472.03
(58) Field of Search ..................... 235/462.25, 462.41, 235/462.42, 472.01–472.03

(56) References Cited

U.S. PATENT DOCUMENTS

| | | | | |
|---|---|---|---|---|
| 3,926,292 A | * | 12/1975 | Ramsden, Jr. | ................ 400/76 |
| 4,092,525 A | * | 5/1978 | Daboub et al. | ......... 235/462.17 |
| 4,401,892 A | * | 8/1983 | Peters | ......................... 250/566 |
| 4,578,571 A | * | 3/1986 | Williams | ................ 235/462.25 |
| 4,639,874 A | * | 1/1987 | Pezaris | ....................... 700/112 |
| 4,743,773 A | * | 5/1988 | Katana et al. | .......... 235/462.07 |
| 5,473,148 A | * | 12/1995 | Tanaka et al. | .......... 235/462.18 |
| 5,697,699 A | * | 12/1997 | Seo et al. | .................... 362/252 |
| 6,101,266 A | * | 8/2000 | Laskowski et al. | .......... 382/135 |

FOREIGN PATENT DOCUMENTS

EP          1040854 A2 * 10/2000  .............. A63F/1/02

* cited by examiner

*Primary Examiner*—Michael G. Lee
*Assistant Examiner*—Seung H Lee
(74) *Attorney, Agent, or Firm*—Coats & Bennett, P.L.L.C.

(57) ABSTRACT

An improvement in manual bar code readers to improve the reliability and eliminate read errors. The improvement comprises a plurality of sensors in a single unit arranged such that a single manual scan results in multiple reads of the bar code. The results of the reads are then compared bit-wise and any read error in any bit is corrected via a bitwise majority voting scheme.

20 Claims, 3 Drawing Sheets

MANUAL BAR CODE SCANNER WITH IMPROVED RELIABILITY

FIELD OF THE INVENTION

This invention related to the field of bar codes and, in particular, to a small, reliable manual bar code scanner that can be embedded in other electronic devices, for example, a mobile telephone.

BACKGROUND OF THE INVENTION

Bar codes have become ubiquitous in today's society. Nearly every product sold bears a bar code which identifies the type of product, the manufacturer of the product and the identity of the product. In the very near future, it is envisioned that bar code readers will be coupled with mobile telephones to allow users of the device to scan and transmit numbers over the phone which have been scanned from a bar code. One application of this technology is to allow consumers to place orders for products from printed advertisements in which bar codes may be used to input information necessary to complete the sale of the item, for example, the seller's telephone number and the bar code of the item being purchased. It may also be possible to scan the buyer's credit card information directly from the credit card being used to complete the transaction, provided the credit card bears the buyer's account number in bar code format.

Currently, there are two types of non-contact bar code scanners available in the market place. These are bar code readers that can scan a bar code without the reader physically contacting the bar code. One is an area scan bar code reader that uses a CMOS camera sensor. The other type is a one dimensional laser scanner, which is typically used at a cash register. It shows one red horizontal line and uses oscillating mirrors to scan. These types of bar code readers are very reliable, because they automatically scan over same bar code many times to reduce errors, typically, about 30 times per second. In other words, it integrates the signal to improve the signal-to-noise ratio. This is the key advantage of this type of scanner. However, the drawback with these types of scanners is that they are relatively large to include the scanning mirror or too expensive due to the requirement for the camera type CMOS sensor. As such, they are not suitable for embedded, portable applications, such as the one described above.

There are also bar code readers which are less expensive which are based on a manual scan. These are one-pass scanners and require physical contact between the scanner and the bar code. These types of scanners, while inexpensive and portable, are also very unreliable and error prone, often requiring that a user scan many times to get an error free reading of the bar code. A light pen type bar code reader is one example of such a device.

It is therefore desirable to provide a bar code scanner that is small, portable and inexpensive, such that portable, embedded applications are possible, while still retaining the reliability of the larger, more expensive units.

SUMMARY OF THE INVENTION

The present invention overcomes the deficiencies in the art by providing a manual bar code scanner that scans the bar code multiple times in one pass. This is accomplished by providing three sensors adjacent to each other such that, as the scanner is scanned over the bar code, the bar code is read three times.

Specifically, the invention consists of a bar code scanner having preferably three light sensors with corresponding light sources for illuminating the bar code. In the preferred embodiment, the sensor diodes are spaced side-by-side approximately 2 mm apart. The same bar code is thus read by all three sensors in series as the bar code is manually scanned one time. Errors in the reading of the bar code are eliminated by a bit-wise majority voting scheme, which is able to correct a one-time read error in any single bit.

Three light sources which act as source of reflected light for their corresponding sensors are modulated at 100 kHz. This has an effect similar to a chopper circuit. Thus, reflected light sensed at the sensors is much higher frequency than the bar code signal itself. As a result, the reflected light signal at the sensor can be easily amplified and demodulated as a high frequency AC signal. Also, interference light such as florescent light will not interfere with reflected light signal, because reflected signal will be band pass filtered to filter out any interfering signals. In the preferred embodiment, the bar code signal is typically a relatively low frequency (<3 Khz) signal when the user manually scans over it. The light source operates as a modulator to generate a high frequency (about 100 kHz) AC signal for ease of signal processing in the receiver.

Thus, the novel aspects of the present invention are the modulation of the light sources at a high frequency and synchronous demodulation, bit-wise majority vote to correct read errors and the side-by-side placement of the light source/light sensor pairs to enable multiple reads per pass.

DETAILED DESCRIPTION OF THE INVENTION

Figure 1:
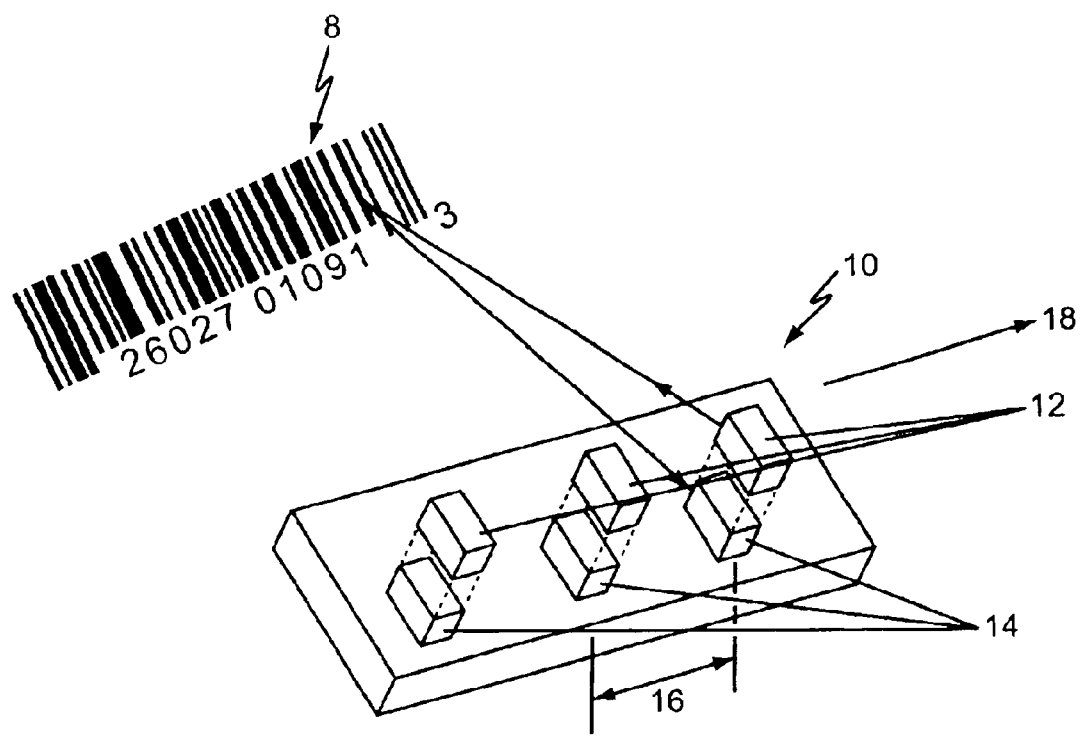
FIG. 1 shows the layout of the components of one embodiment of the present invention.

FIG. 1 shows the basic layout of the invention in the preferred embodiment. Light sensors 14 are paired with corresponding light sources 12. In the preferred embodiment the light sensors can be light sensing diodes while the light sources can be LEDs. Preferably, the light sensors are arranged in a side-by-side manner, as shown in FIG. 1, such that one manual scan of bar code 8 will produce three sequential readings, one in each of the light sensors. Preferably the light sensors are evenly spaced apart by spacing 16, which may vary. In the preferred embodiment, spacing 16 is approximately 2 mm.

As scanner 10 is scanned over bar code 8 in direction 18, light sensors 14 will detect light reflected from the light and dark areas of bar code 8. Light sources 12 are placed such that light sensors 14 will detect light primarily from the corresponding light source 12. Also, the field of view of sensors 14 is very narrow to avoid sensing extraneous light from sources other than the corresponding light source 12. It is also conceivable to put a separating wall between sensors, so that reflected light can only be sensed by the corresponding sensor, not by an adjacent sensor. Each of the light sources 12 is modulated at approximately 100 kHz. Therefore, each light source 12 acts like a light modulator at 100 kHz.

In an alternate embodiment, it is also possible to modulate each of the light sources at 100 kHz, but at different phases.

In other words, there is a phase difference between each LED modulating signal. Thus, light reflected from the bar code sensed by the sensor is synchronously demodulated at the same phase as the light source modulating signal. Therefore, light reflected from the bar code from adjacent light sources does not interfere, because it is modulated at a different phase. This ensures proper operation even when the user operated the scanner improperly by not making good contact between the scanner and the bar code. In such a case, a narrow field of view cannot be assumed.

In another alternate embodiment it is also possible, in lieu of modulating light sources 12 sequentially, to sample sensors 14 sequentially while leaving light sources 14 illuminated. This approach produces basically the same results.

The signal level of the reflected signal received at the sensors 14 varies depending on whether it is reflected on black code bar or white bar code bar. If it is reflected on a white bar, its signal level will be relatively high. If it is reflected on black bar, the signal will be relatively low, or hardly any signal would be detected. The baseband bar code signal is generated by the reflected light beam on the surface of the bar code. The frequency of the baseband signal is a function of the manual scan speed and the spacing between the bars comprising bar code 8. Typically this bandwidth is less then 3 kHz. Light sources 12 are modulated at a much higher frequency than the bar code baseband signal frequency to allow for proper edge alignment correction. Additionally, the sequential modulation of the light sources 12 avoids interference and background noise caused by ambient light. Reflected light signal S(t) can be expressed mathematically as follows:

$$S(t) = A\cos(wt)$$

where A is the reflection coefficient of the bar code. A can vary between 0 (no reflection at all) and 1 (fully reflected). "w" is 2 f and f is the modulation frequency. A can be considered as a low frequency (<3 Khz) binary signal generated as user scans scanner over the bar code.

Figure 2:
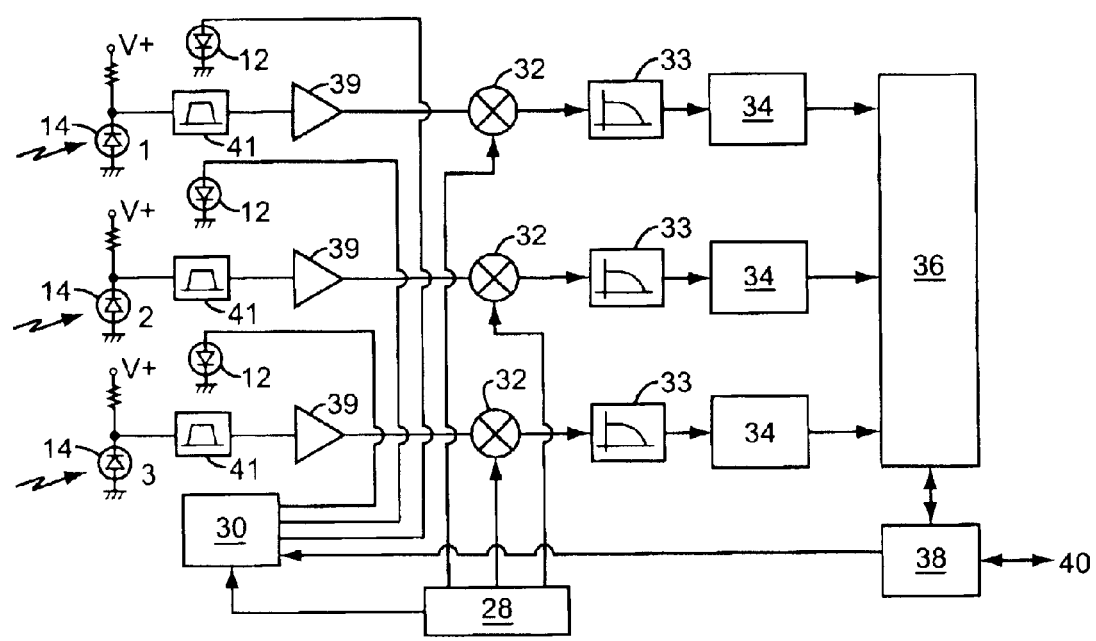
FIG. 2 shows one possible circuit that can be used for the present invention

One possible circuit for this implementation is shown in FIG. 2. LED driver 30 drives light sources 12 based on the frequency of oscillator 28 and controlled by microprocessor 38. As sensors 14 sense the barcode baseband signal, the demodulation takes place using the same signal as was used to modulate light sources 12, i.e., that produced by oscillator 28. This is possible because of an almost zero time delay between when the light is sent and the reflected light is sensed.

The reflected signal received at the sensor is filtered by band pass filter 41 and then amplified by amplifier 39. Amplified signal S(t) is multiplied by modulation signal cos(wt) in mixer 32. Cos(wt) is same signal as the modulating signal for light sources 12. Thus, amplified signal S(t) can be synchronously demodulated. This process can be expressed mathematically as shown below.

$$S(t) \times \cos wt = A \cos wt \times \cos wt$$
$$= A/2 \times (1 + \cos 2wt)$$
$$= A/2 + (A \cos 2wt)/2$$

The output of mixer 32 consists of two signal components. One is A/2, which is the reflection coefficient and the base band signal. Another is ½ A cos(2 wt), which is twice the modulation frequency. This component can be easily filtered out by low pass filter 33 after mixer 32. Only base band signal A/2 is fed to threshold detector 34. Threshold detector 34 is responsible for converting the demodulated baseband analog signal to a binary digital baseband signal. The demodulated baseband signal wave shape is not a clean binary digital signal due to analog signal processing. Edges of the waveform will tend to be some what rounded. Thus, threshold detector 34 reshapes the wave form into a binary digital wave form. The threshold can preferably be dynamically changed based on the average received signal level. As the scan is taking place, the demodulated and reshaped digital bits are stored in RAM 36. These digital bits have different bit lengths, because bar codes are not binary digital data. Each bar code has a different duration. So, digital bits can be said to be pulse code modulated. The pulse code modulated bits have to be converted into true binary bits. Thus, a wide width black bar can be converted into 00000000, wherein the number of zeros corresponds to the width of black bar. A white bar between black bars can be converted into 11111111, wherein the number of ones corresponds to the width of white bar (note that a white bar is in reality a gap between black bars).

The converted binary data bits are stored in the buffer for further processing by the microprocessor. Once the scan is complete, the data is retrieved from the buffer and two corrections are made thereto, resulting in code 40. The first correction is a time alignment which needs to be performed due to the spacing 16 between light sensors 14. Because the scan is done sequentially, there will be a time offset between the reading of the bar code by each of the light sensors 14. Microprocessor 38 compares the sampled digital data stored in buffer RAM 36 and makes the appropriate time alignment based on data correlation between the data from the three sensors.

The second correction is edge correction. Edge correction compensates for a non-constant scanning speed. Because scanner 10 is a manual scanner, a constant scanning speed cannot be assumed, and the scan speed may vary even during a very short scan time. Therefore, the edge transitions for each bit of the signal needs to be aligned by microprocessor 38. The edge transition alignment is based on prior and after present data bit information. In other words, it is estimated based on the most likely spot of the transition.

Figure 3:
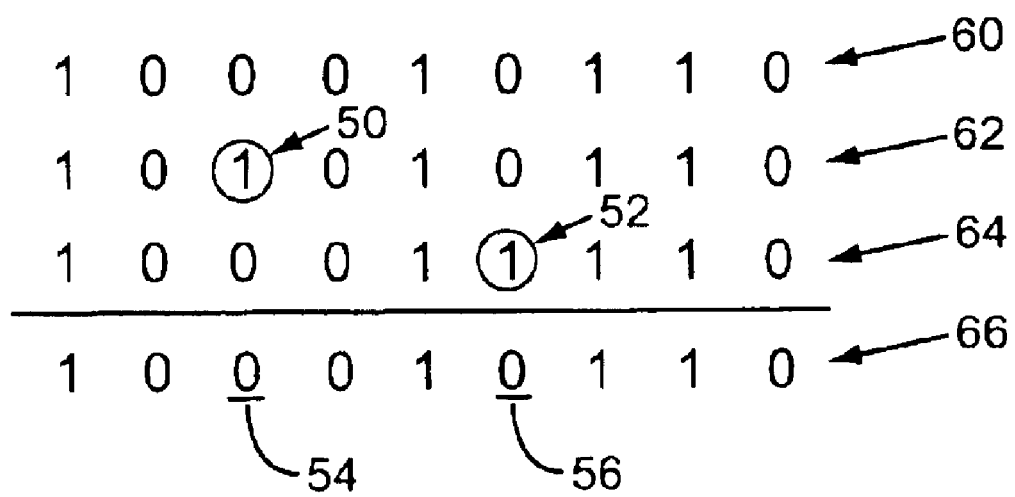
FIG. 3 shows an example of read errors from different sensors and the capability to correct via majority voting.

Once the sample data is precisely time aligned and edge corrected, the final determination and correction of any read errors can be made via a bitwise majority vote. Time and edge alignment mean that the number of 0's and 1's are properly corrected to represent the original bar codes. A wide black bar has more 0's than a thin black bar and vice versa for a white bar (gap). This process is shown in FIG. 3. In this example a group of 0's is represented as a single 0 for simple explanation of the concept, but in essence, it represents actual black bar width in digital form. In FIG. 3 the output from the first sensor 60 shows a scan without read error. Output from the second sensor 62 shows error 50 in the third bit, and output from the third sensor 64 shows error 52 in the sixth bit. A bitwise majority voting scheme is used to correct these errors and the corrected result is shown as 66. Corrected bits 54 and 56 reflect the results of the bitwise majority voting scheme.

The result of the use of multiple scanning hardware producing multiple samples per scan, modulating the light sources or the sampling of the light sensors at a high frequency to produce the modulated signals, and the majority voting scheme results in a much more reliable barcode reader than in is available in the prior art.

While the preferred embodiment of the invention has been discussed, the invention is not meant to be limited to specific components or parameters discussed herein. The scope of the invention is embodied in the claims which follow.

I claim:

1. A scanner for reading bar codes comprising:

a plurality of sensors; and a corresponding plurality of light sources;

said sensors and light sources arranged such that each one of said plurality of sensors senses reflected light primarily from a corresponding light source, wherein all of said sensors are operative to read the same bar code elements in succession.

2. The scanner of claim 1 wherein said plurality of sensors are arranged in a side-by-side relationship such that said bar code is read a plurality of times each time said scanner is passed over said bar code.

3. The scanner of claim 2 wherein said sensors are light sensing diodes and wherein said light sources are red light emitting diodes.

4. The scanner of claim 2 wherein said sensors are spaced about 2 mm from each other.

5. The scanner of claim 2 wherein said bar code is read by each of said plurality of light sensors in series.

6. The scanner of claim 5 wherein a signal is received from each of said light sensors, said signal comprising an analog bar code base band signal modulated by a high frequency signal.

7. The scanner of claim 6 further comprising: a mixer, wherein said signal from plurality of light sensors is multiplied by the modulation signal for synchronous demodulation; and a threshold detector; wherein said demodulated signals from said mixer is reshaped and converted from an analog to a binary digital signal by said threshold detector.

8. The scanner of claim 7 further comprising a logic circuit having as input said plurality of digital signals, wherein said logic circuit processes said digital signals.

9. The scanner of claim 8 wherein each of said digital signals received from said each of said light sensors is displaced in time from said signals from all other light sensors, due to said light sensors being physically spaced from one another.

10. The scanner of claim 9 wherein said logic circuit time aligns said plurality of digital signals.

11. The scanner of claim 8 wherein said logic circuit performs an edge alignment of said digital signals to compensate for a non-constant scanning speed.

12. The scanner of claim 8 wherein said logic circuit performs a bit-wise comparison of said plurality of digital signals and corrects read errors via a bitwise majority voting scheme.

13. The scanner of claim 6 wherein said high frequency modulating signal is produced as said light sources are sequentially cycled at a predetermined rate.

14. The scanner of claim 13 wherein said predetermined cycling rate is about 100 kHz.

15. The scanner of claim 13 wherein each of said light sources is out of phase with respect to all other light sources.

16. The scanner of claim 6 wherein said high frequency modulating signal is produced as said plurality of light sensors are sampled in a sequential manner at a predetermined rate.

17. The scanner of claim 16 wherein said predetermined sampling rate is about 100 kHz.

18. The scanner of claim 1 wherein there are three light sensors and three corresponding light sources.

19. The scanner of claim 18 further comprising: circuitry for modulating said light sources at a high frequency to produce a signal comprising a bar code baseband signal modulated by said high frequency.

20. The manual scanner of claim 19 wherein said improvement further comprises: a logic circuit for performing bit wise comparison of said signals read from said plurality of light sensors and for correcting read errors via a bitwise majority voting scheme.

* * * * *